United States Patent [19]

Chass

[11] 4,437,019

[45] Mar. 13, 1984

[54] LINEAR DIFFERENTIAL TRANSFORMER WITH CONSTANT AMPLITUDE AND VARIABLE PHASE OUTPUT

[75] Inventor: Jacob Chass, Rego Park, N.Y.

[73] Assignee: Pickering & Company, Inc., Plainview, N.Y.

[21] Appl. No.: 464,754

[22] Filed: Feb. 7, 1983

[51] Int. Cl.³ .................. H02J 3/00; H01F 71/06
[52] U.S. Cl. .................... 307/83; 336/136; 340/870.36
[58] Field of Search .............. 323/346, 347; 340/870.32, 870.36, 870.35; 336/136, 130; 307/83

[56] References Cited

U.S. PATENT DOCUMENTS 2,459,210  1/1949  Ashcraft .................. 336/136 X
2,640,967  6/1953  Macgeorge .................. 336/136

Primary Examiner—Thomas J. Kozma
Attorney, Agent, or Firm—Kane, Dalsimer, Kane, Sullivan and Kurucz

[57] ABSTRACT

A differential transformer is provided comprising an elongated secondary winding of uniform turn density. First and second transformer primary windings are wound about the secondary winding. The primary windings lie generally in parallel spaced apart planes which cut the axis of the secondary winding at an angle other than 90°. A core of magnetic material is movable linearly along a path parallel to the secondary winding axis and serves to couple the primary and secondary windings. The primary windings are connected to AC sources which are 90° out of phase with each other.

12 Claims, 4 Drawing Figures

U.S. Patent  Mar. 13, 1984  4,437,019
FIG. 1
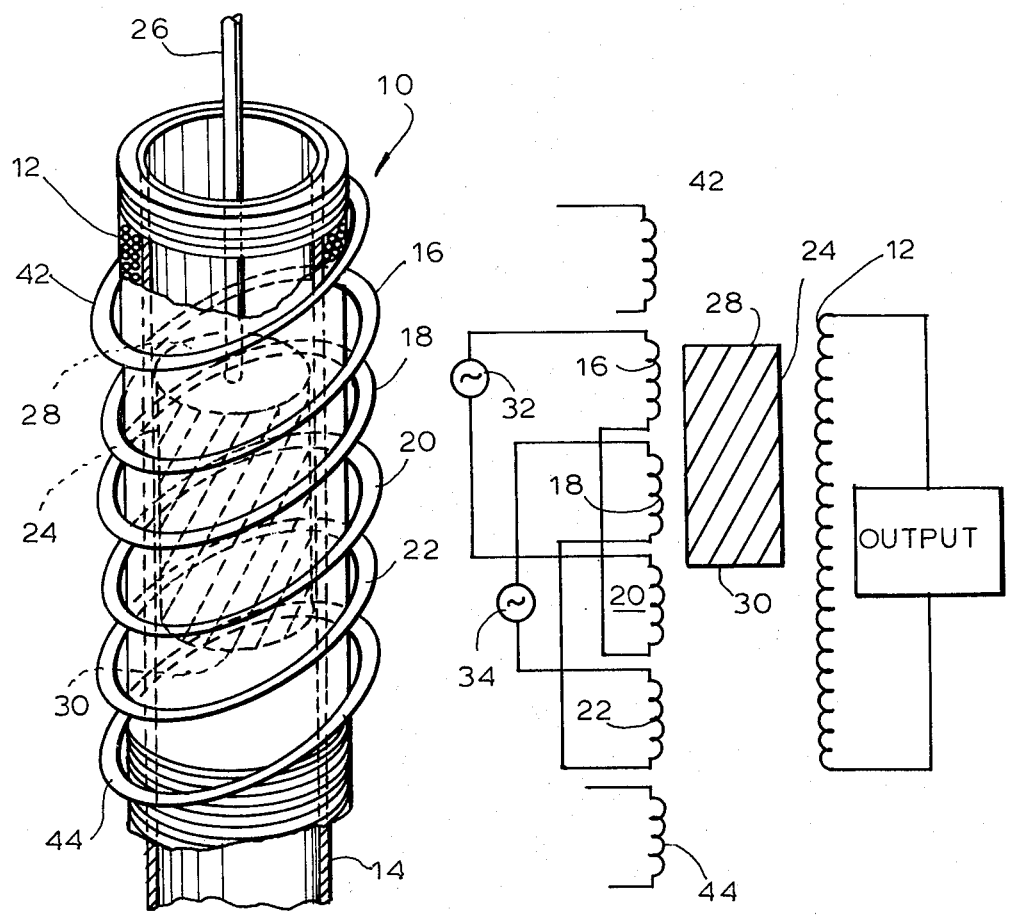
FIG. 2
FIG. 3
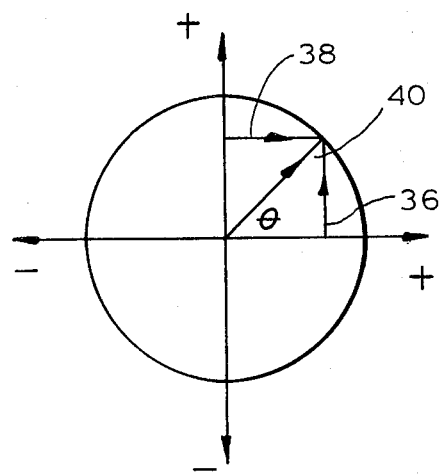
FIG. 4
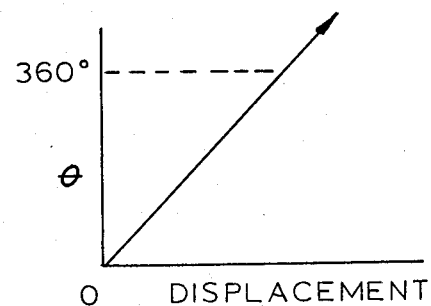

LINEAR DIFFERENTIAL TRANSFORMER WITH CONSTANT AMPLITUDE AND VARIABLE PHASE OUTPUT

BRIEF DESCRIPTION OF THE INVENTION

The present invention relates generally to linear displacement detecting transducers and more particularly to such a transducer wherein the output signal varies in phase substantially linearly with respect to linear displacement.

It has heretofore been proposed to provide a transducer which produces an output signal which varies in response to the linear displacement of a sensing element. In U.S. Pat. No. 3,546,648, a linear variable differential transformer (LVDT) is disclosed wherein the amplitude of the output signal is a function of the linear displacement of a movable core with respect to fixed primary and secondary coils. While this type of device has the advantage of relative ease of manufacture and assembly, there are some applications in which a relatively constant amplitude output signal may be desirable or mandatory.

In U.S. Pat. No. 4,282,485 a linear variable phase transformer (LVPT) is disclosed and described as providing a constant amplitude output which shifts in phase with the displacement of a core member. The device, while generally producing the desired constant amplitude output, is relatively complex to produce in that it relies on a series of adjacent coaxial coils wound so that the circumferential winding turns are distributed along the axial length according to a sinusoidal function. In addition to the difficulties inherent in precisely winding such coil segments, the sinusoidal function is actually synthesized in a series of discrete steps. In addition, since the primary windings overlie each other there is flux leakage between the primary coils.

In view of the above, it is a principal object of the present invention to provide an improved transformer having an output signal which is constant in amplitude and variable in phase with respect to linear displacement of its sensing element.

A further object is to provide such a transformer in which the phase of the output signal varies linearly with linear displacement of the sensing element.

A still further object of the present invention is to provide such a transformer wherein the accuracy of the output signal is constant over the transformer operating range.

A still further object is to provide such a transformer which is readily easy to manufacture and assemble.

SUMMARY OF THE INVENTION

The above and other beneficial objects and advantages are attained in accordance with the present invention by providing a differential transformer comprising an elongated coil extending longitudinally along an axis and serving as a transformer secondary winding. At least two primary windings are provided lying generally in spaced parallel planes which cut through the secondary axis at an angle other than 90°. Each of the primary windings is wound about the secondary winding. A core of magnetic material is disposed for linear movement parallel to the axis and equal in length to at least the minimal axial distance between the primary windings so that when the primary windings are excited by AC voltages 90° out of phase with each other, the phase of the secondary winding output voltage will vary with the linear displacement of the core between the primary windings.

Third and fourth identical primary windings disposed in parallel and equi-spaced apart planes may be provided and connected in series bucking relationship to the first and second primary coils respectively to increase the operating range of the transformer. By providing a core sufficiently long to span three of the primary coils the phase angle of the output voltage will vary linearly with the displacement of the core.

Additional primary coils may be provided along the length of the secondary connected alternately to either the first or second set of primary coils in series bucking relationship to further increase the operating range of the transformer and to minimize end effects.

BRIEF DESCRIPTION OF THE DRAWINGS

In the accompanying drawings:

FIG. 1 is a simplified perspective view of a differential transformer in accordance with the present invention with portions thereof cut away for clarity;

FIG. 2 is a schematic view of the differential transformer of the present invention;

FIG. 3 depicts the phase relationship of the output signal; and,

FIG. 4 sets forth the relationship between linear displacement of the core and the plane angle of the output signal.

DETAILED DESCRIPTION OF PREFERRED EMBODIMENT

Reference is now made to FIG. 1 wherein a differential transformer 10 in accordance with the present invention is depicted. The transformer is mounted in a casing of magnetic shielding material with the ends sealed with magnetic end caps (not shown). The transformer 10 comprises an elongated electrical coil 12 having a uniform number of turns per unit length wound on a cylindrical bobbin 14 formed of a non-conducting non-magnetic material. A series of spaced, slanted primary coils 16, 18, 20 and 22 are provided each lying in a plane which forms an angle with respect to the axis of the secondary coil that is something other than 90°. The planes in which coils 16, 18, 20 and 22 lie are equi-spaced from each other. Each of the primary coils contains the same number of turns and the planes upon which the coils generally lie are parallel to each other. As shown in FIG. 2, primary coils 16 and 20 are connected to each other in a bucking series arrangement. Similarly, coils 18 and 22 are connected to each other in a series bucking arrangement.

A core 24 formed of a magnetic material is disposed within the bobbin. A shaft 26 serves to transmit the linear displacement to be measured to the core 24.

As will be noted, the length of core 24 and the placement of the adjacent primary coils are such that as one end 28 of core 24 passes through the plane of one primary coil, the opposite end 30 of the core starts to pass through the plane of the next primary coil that is connected to that primary coil. That is, the core is sufficiently long to span the minimum distance between three adjacent coils. The reason for this is to provide a linear output of the transformer output phase angle with respect to displacement of the core as shown in FIG. 4.

Referring again to FIG. 2, it should be noted that coils 16 and 20 are connected to AC source 32 and coils 18 and 22 are connected to AC source 34. The AC sources are identical except that they are 90° out of phase with each other.

The operation of the transformer is as follows. When a cylinder is intersected by a plane at an angle other than 90° to its axis, the intersecting edge of the cylinder when laid flat is sinusoidal. As a result, as core 24 passes through the plane carrying coil 16 (for example) the number of windings cut by core 24 and hence the flux induced in the core will vary sinusoidally. At the same time, the flux lines induced in the core from the adjacent coil 18 are also varying sinusoidally however since coils 16 and 18 are excited by AC sources which are 90° out of phase with each other the coupling flux from coil 16 will be 90° out of phase with the flux from coil 18. The total flux induced in core 24 and hence the flux induced in the secondary winding 12 of the transformer comprises the vector sum of the flux in core 24 generated by the two adjacent coils. Since the adjacent coils are excited by AC voltages 90° out of phase with each other, they will be producing sine and cosine components 36 and 38 of an angle $\theta$ producing a constant amplitude output signal 40. The phase angle $\theta$, in turn, is a function of the position of the core with respect to the coils. By connecting alternate primary coils (such as 16 and 20) in bucking series and providing a core sufficiently long to span three coils, the flux from the primary coils will be induced in the core to produce a linear relationship between phase angle and core displacement. Thus, as the core sweeps downwardly, the angle $\theta$ will rotate through the four quadrants of the phase diagram of FIG. 3. The phase angle $\theta$ would continue sweeping through 360° for every four primary coils through which the core moves in the manner described above. Each additional primary coil must be mounted in a series bucking relationship to the last previous alternate coil to continue the sequence described. Thus, coil 42 would be connected in series bucking relationship to coil 18 and coil 44 would be connected in series bucking relationship to coil 20. Although only four primary coils are needed to enable the transformer output to sweep through 360° it should be noted that two additional coils must be provided at the ends of the transformer to compensate for end effects. Thus, six primary coils are required to sweep through the first 360° but only four additional coils are required for each additional 360° of output phase angle sweep.

As noted previously, the angle at which the planes of the primary coils intersect the axis of the secondary coil is immaterial so long as that angle is not 90°. The reason for this is that at every angle other than 90°, the intersection of the planes of the primary coils and the cylinder of the secondary winding will unfold into a sinusoidal function. Accordingly, an angle may be chosen based on the geometrical constraints within which the transformer must operate.

Thus, in accordance with the above, the aforementioned objectives are effectively attained.

Having thus described the invention, what is claimed is:

1. A differential transformer comprising:
    an electrical coil extending longitudinally along an axis providing a transformer secondary winding;
    first and second transformer primary windings defined by electrical coils lying generally in spaced parallel first and second planes which cut said axis at an angle other than 90°, each of said primary winding extending about said secondary winding; and,
    a core of magnetic material disposed for linear movement parallel to said axis and equal in length to at least the minimal axial distance between said primary windings whereby when said primary windings are excited by AC voltages 90° out of phase with each other the phase of the secondary winding output voltage will vary with the linear displacement of said core between said primary windings and the amplitude of said output voltage will remain constant.

2. The transformer in accordance with claim 1 wherein each of said primary windings has the same number of turns.

3. The transformer in accordance with claim 1 further comprising:
    a third transformer primary winding extending about said secondary winding, connected in bucking series to one end of said first primary winding and lying generally in a third plane parallel to said planes; and,
    a fourth transformer primary winding extending about said secondary winding, connected in bucking series to one end of said second primary winding and lying generally in a fourth plane parallel to said planes; said first, second, third and fourth primary windings being equi-spaced along said axis.

4. The transformer in accordance with claim 3 wherein each of said primary windings has the same number of turns.

5. The transformer in accordance with claim 3 wherein said core is sufficiently long to intersect at least portions of three of said primary coils.

6. The transformer in accordance with claim 5 further comprising a fifth transformer primary winding extending about said secondary winding, connected in series bucking to the other end of said first primary winding and lying generally in a fifth plane parallel to said planes; and,
    a sixth transformer primary winding extending about said secondary winding, connected in bucking series to the othe end of said fourth primary winding and lying generally in a sixth plane parallel to said planes; said first, second, third, fourth, fifth and sixth primary windings being equi-spaced along said axis.

7. A differential transformer comprising:
    an electrical coil extending longitudinally along an axis providing a transformer secondary winding;
    first and second transformer primary winding defined by electrical coils lying generally in spaced parallel first and second planes which cut said axis at an angle other than 90°, each of said primary winding extending about said secondary winding; and,
    a core of magnetic material disposed for linear movement parallel to said axis and equal in length to at least the minimal axial distance between said primary windings;
    a first AC source connected to said first transformer primary winding; and,
    a second AC source connected to said second transformer primary winding, said first and second AC sources being equal in amplitude and 90° out of phase with each other.

8. The transformer in accordance with claim 7 wherein each of said primary windings has the same number of turns.

9. The transformer in accordance with claim 7 further comprising:

a third transformer primary winding extending about said secondary winding, connected in bucking series to one end of said first primary winding and lying generally in a third plane parallel to said planes; and, a fourth transformer primary winding extending about said secondary winding, connected in bucking series to one end of said second primary winding and lying generally in a fourth plane parallel to said planes; said first, second, third and fourth primary windings being equi-spaced along said axis.

10. The transformer in accordance with claim 9 wherein each of said primary windings has the same number of turns.

11. The transformer in accordance with claim 7 wherein said core is sufficiently long to intersect at least portions of three of said primary coils.

12. The transformer in accordance with claim 11 further comprising a fifth transformer primary winding extending about said secondary winding, connected in series bucking to the other end of said first primary winding and lying generally in a fifth plane parallel to said planes; and, a sixth transformer primary winding extending about said secondary winding, connected in bucking series to the other end of said fourth primary winding and lying generally in a sixth plane parallel to said planes; said first, second, third, fourth, fifth and sixth primary windings being equi-spaced along said axis.

* * * * *